United States Patent
Kosaka

[15] 3,670,722
[45] June 20, 1972

[54] ELECTRIC POWER SUPPLYING DEVICE FOR AN ENDOSCOPE

[72] Inventor: Shinya Kosaka, Tokyo, Japan
[73] Assignee: Olympus Optical Co., Ltd., Tokyo, Japan
[22] Filed: Aug. 17, 1970
[21] Appl. No.: 64,513

[30] Foreign Application Priority Data

Aug. 18, 1969 Japan..............................44/65234

[52] U.S. Cl...................................................128/6
[51] Int. Cl. ..............................................A61b 1/06
[58] Field of Search ............................128/6, 7, 8, 9

[56] References Cited

UNITED STATES PATENTS 2,764,149   9/1956   Sheldon......................................128/6
2,867,209   1/1959   Foures et al. ..............................128/6

Primary Examiner—Channing L. Pace
Attorney—Kelman and Berman

[57] ABSTRACT

Electric power supplying device for an endoscope having a photographing device, a lamp for illuminating an object for observation and a lamp for illuminating the object for photographing. The device is adoptable to an automatic exposure control type having a photoelectric element and an endoscope of the manual exposure control type. The electric power supplying device has an exposure control device, a first, a second and a third relay. When an endoscope of the automatic exposure control type is connected, the observation lamp is energized and the photoelectric element is connected to the exposure control device and, upon actuation of release means of the endoscope, the first relay is energized to actuate a switching circuit so as to energize the photographing lamp and the exposure control device supplied with the output of the photoelectric element actuates the switching circuit to terminate the energization of the lamp. When an endoscope of the manual exposure control type is connected, the observation lamp is energized and, upon actuation of the release means, the second and the third relay are actuated so as to connect an electric source of adjustable voltage to the exposure control device so that a reference voltage manually set in the source is supplied to the exposure control device while the first relay is actuated by the third relay to actuate the switching circuit so as to energize the photographing lamp which is deenergized after a time period corresponding to the reference voltage by the actuation of the switching circuit controlled by the exposure control circuit.

8 Claims, 10 Drawing Figures

INVENTOR
Shinya Kosaka
BY Kelman and Berman
Agents

ELECTRIC POWER SUPPLYING DEVICE FOR AN ENDOSCOPE

BACKGROUND OF THE INVENTION

The present invention relates to an electric power supplying device for an endoscope having a photographing device and more particularly to an electric power supplying device commonly usable with an endoscope having a photographing device of the automatic control type and an endoscope having a photographic device of the manual exposure control type.

Heretofore, an electric power supplying device has been constructed for use exclusively with the particular type of an endoscope such as an endoscope of the automatic exposure control type having a photoelectric element or an endoscope of the manual exposure control type, and the electric power supplying device can not be used commonly with the different types of the endoscopes, thereby making it expensive when various types of endoscopes are used.

In a prior art endoscope of the automatic exposure control type, the exposure time is automatically determined by the automatic exposure control device in the electric power supplying device receiving the output of the photoelectric element in the endoscope, and a manual control of the exposure time can not be effected.

On the other hand, in a prior art electric power supplying device for an endoscope of the automatic exposure control type having a photographing device, the automatic exposure control device incorporated in the electric power supplying device can not be adapted commonly to different types of the films or the different types of endoscopes such as a gastrocamera, an esophagocamera, a bronchocamera and the like, because the brightness of the object and the optical system of the endoscope are varied depending upon the purposes, thereby requiring a plurality of electric power supplying devices for the respective types of the endoscopes, thus resulting in a high cost.

The present invention aims at avoiding the above described disadvantages of the prior art electric power supplying devices for the endoscopes.

SUMMARY OF THE INVENTION

An object of the present invention is to provide a novel and useful electric power supplying device commonly usable with endoscopes of the automatic exposure control type and the manual exposure control type.

Another object is to provide a novel and useful electric power supplying device for an endoscope by which an endoscope of the automatic exposure control type can be used as the manual exposure control type by operating a switch provided in an adapter connecting the endoscope to the electric power supplying device.

A further object of the present invention is to provide a novel and useful electric power supplying device commonly usable with different types of endoscopes of the automatic exposure control type.

The above objects are achieved in accordance with the present invention by the provision of an electric power supplying device for use with an endoscope having a photographing device, a lamp for illuminating an object for the observation and a lamp for illuminating the object for the photographing, the electric power supplying device having an exposure control device, a switching circuit, a voltage adjustable electric source, a first, a second and a third relay, and a first, a second and a third electric source for energizing the lamp for the observation, for energizing the lamp for the photographing and for energizing the relays, respectively. The first, the second and the third relays are so connected to the electric sources, the switching circuit and the exposure control circuit that, when an endoscope of the automatic exposure control type having a photoelectric element is connected to the electric power supplying device through an adapter belonging to the endoscope to be connected, the photoelectric element is connected to the exposure control device while the lamp for the observation is energized and, upon actuation of release means in the endoscope, the first relay is actuated to actuate the switching circuit so as to energize the lamp for the photographing and the photoelectric element receiving the light of the lamp for the photographing reflected from the object supplies its output to the exposure control circuit so that, after the lapse of the time determined therein in accordance with the intensity of light from the object, the switching circuit is actuated to terminate the energization of the lamp for the photographing for the proper exposure, while, when an endoscope of the manual exposure control type is connected to the electric power supplying device through an adapter belonging to the endoscope to be connected, the lamp for the observation is energized and, upon actuation of the release means, the second and the third relay are actuated to connect the voltage adjustable electric source to the exposure control circuit so as to supply a reference voltage manually set in the voltage adjustable electric source to the exposure control circuit while the first relay is actuated by the third relay to actuate the switching circuit so as to energize the lamp for the photographing and, after the lapse of a time period corresponding to the reference voltage manually set in the voltage adjustable electric source, the switching circuit is actuated by the exposure control circuit so that the lamp for the photographing is deenergized for the manually controlled exposure.

In accordance with another feature of the present invention, the adapter of the endoscope of the automatic exposure control type is provided with a switch for permitting the endoscope to be operated as the manual exposure control type. By switching the switch, the second and the third relay are actuated instead of the first relay so that the voltage adjustable electric source is connected to the exposure control circuit in place of the photoelectric element so as to obtain the manual exposure control.

In accordance with a further feature of the present invention, an amplifier is provided in the exposure control circuit in the electric power supplying device so as to amplify the voltage supplied by the photoelectric element of the endoscope of the automatic exposure control type. A variable resistor is connected between the amplifier and the electric source so that the output of the amplifier is adjustable when the input of the amplifier from the photoelectric element so that, by appropriately adjusting the output voltage of the amplifier, different types of films or different types of the endoscopes can be used interchangeably with one and the same electric power supplying device.

DETAILED DESCRIPTION OF THE PREFERRED EMBODIMENTS

Figure 1:
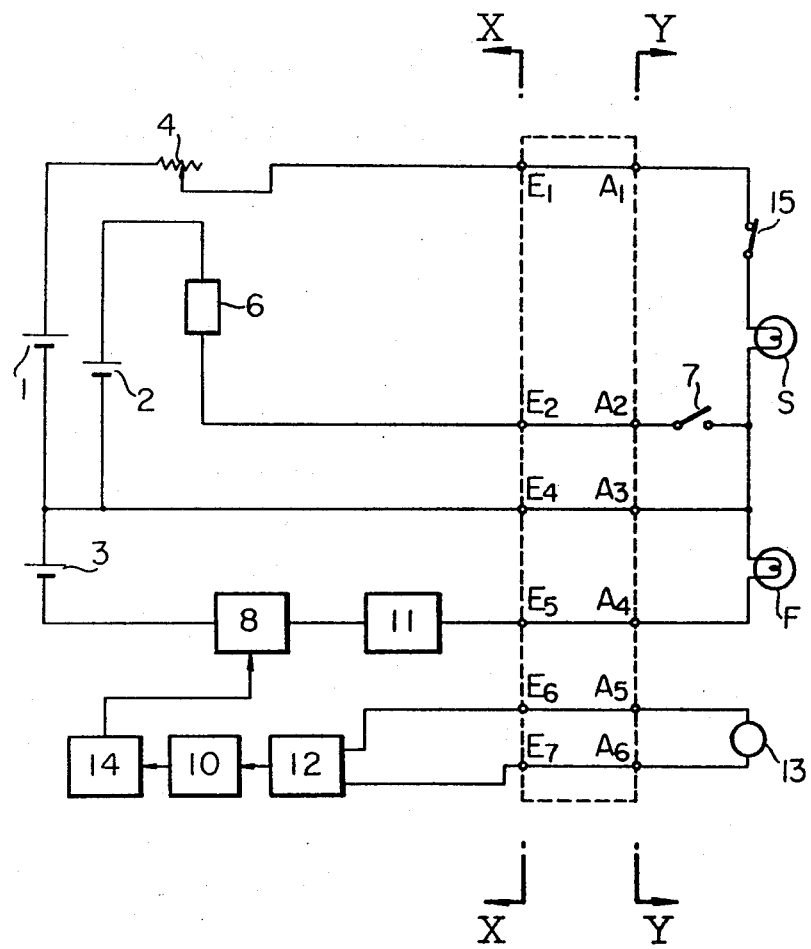
FIG. 1 is a diagram showing the electric connection of the prior art electric power supplying device with an endoscope of the automatic exposure control type.

Referring to FIG. 1 showing the prior art electric power supplying device for the endoscope of the automatic exposure control type having a photoelectric element, the portion at the left side from line X — X is the electric power supplying device connected to the endoscope shown at the right side from line Y — Y in the drawing through an adapter shown in the drawing between lines X — X and Y — Y. The adapter is connected to the endoscope at terminals $A_1$, $A_2$, $A_3$, $A_4$, $A_5$ and $A_6$, while the adapter is connected to the electric power supplying device at external output terminals $E_1$, $E_2$, $E_3$, $E_4$, $E_5$, $E_6$ and $E_7$. Lamp S for the observation is connected between terminals $A_1$ and $A_2$ through normally opened main switch 7 coupled with the release means of the endoscope and normally closed switch 15 and lamp F for the photographing is connected between terminals $A_3$ and $A_4$ with terminal $A_3$ connected to terminal $A_2$ through switch 7, while photoelectric element 13 is connected between terminals $A_5$ and $A_6$.

One terminal of electric source 1 for energizing lamp S is connected to terminal $E_1$ through variable resistor 4 and the other terminal is connected to terminal $E_4$.

One terminal of second electric source 3 for energizing lamp F is connected to terminal $E_4$ while the other terminal is connected to terminal $E_5$ through switching circuit 8 and light intensity control circuit 11. Amplifier 12 is connected to terminals $E_6$, $E_7$ and amplifier 12 is connected to integrating circuit 10 which is in turn connected to voltage detecting circuit 14 for actuating switching circuit 8 to disconnect electric source 3 from lamp F when the voltage detected by detecting circuit 14 reaches a predetermined value.

One terminal of third electric source 2 is connected to terminal $E_2$ through relay 6 which actuates switching circuit 8 to energize lamp F when relay 6 is energized, while the other terminal is connected to terminal $E_4$.

As shown, terminals $A_1$, $A_2$, $A_3$, $A_4$, $A_5$ and $A_6$ are connected to terminals $E_1$, $E_2$, $E_3$, $E_4$, $E_5$, $E_6$ and $E_7$, respectively, when the endoscope is connected to the electric power supplying device through the adapter.

In operation, when the endoscope is connected to the electric power supplying device through the adapter, lamp S is energized by electric source 1 through normally closed switch 15 and variable resistor 4 for the observation of an object to be inspected. By adjusting variable resistor 4, the intensity of light from lamp S is controlled.

When release means (not shown) for operating the photographing device is actuated, normally opened main switch 7 is closed in coupled relation to the actuation of release means so that relay 6 is actuated by electric source 2 so as to actuate switching circuit 8 thereby permitting lamp F to be connected to electric source 3 through switching circuit 8 and light intensity control circuit 11. Thus, lamp F is energized for the photographing.

When lamp F is energized, photoelectric element 13 receives the light of lamp F after it is reflected from the object so that an output is generated in accordance with the intensity of light received by photoelectric element 13. The output is amplified by amplifier 12 and supplied to integrating circuit 10 so as to integrate the input voltage so that voltage detecting circuit 14 supplied with the integrated voltage from integrating circuit 10 is actuated to actuate switching circuit 8 to disconnect electric source 3 from lamp F when the integrated voltage reaches a predetermined value thereby deenergizing lamp F to terminate the exposure. Since the integrated voltage in integrating circuit 10 is indicative of the intensity of light received by photoelectric element 13, the automatic exposure control is achieved.

Switch 15 is coupled with switch 7 and, when switch 7 is closed in coupled relation to the operation of release means, switch 15 is opened so as to deenergize lamp S during the exposure by lamp F.

Light intensity control circuit 11 is so constructed that, when it is actuated, it supplies a high voltage to lamp F for a predetermined time period so as to quickly raise the intensity of light from lamp F to a predetermined intensity and, after the lapse of a predetermined time period, the voltage is lowered to prevent lamp F from being burnt while the predetermined intensity of light is maintained during the exposure. The quick rise of the intensity of light from lamp F is particularly important when the exposure is to be terminated in a very short time period.

Figure 2:
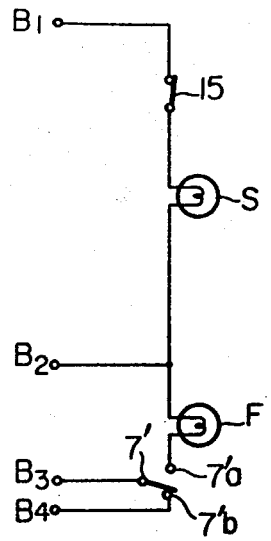
FIG. 2 is a diagram showing an example of the electrical connection of the lamps for the observation and for the photographing provided in an endoscope of the manual exposure control type.
Figure 3:
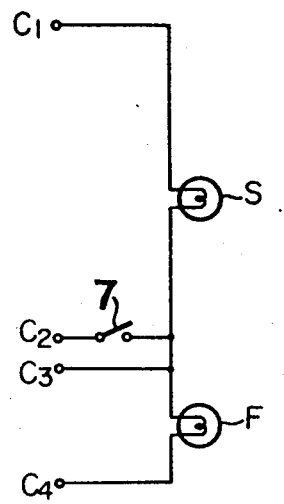
FIG. 3 is a diagram similar to FIG. 2 but showing another example of the electric connection of the lamps in an endoscope of the manual exposure control type.

However, an endoscope of the manual exposure control type such as shown in FIGS. 2 and 3 cannot be used with the above described prior art electric power supplying device, because the construction and the electric connection of the endoscope are different from those of the endoscope of automatic exposure control type as shown in FIG. 1.

In FIG. 2, switch 7' is provided in the circuit of lamp F and, when release means is actuated, the movable contact of switch 7' is connected to stationary contact 7a' to energize lamp F in coupled relation to the operation of release means while normally closed switch 15 is opened in coupled relation to the operation of release means to deenergize lamp S. When release means is freed, the movable contact of switch 7' is disengaged from stationary contact 7a' and returned to contact with stationary contact 7b', while switch 15 is closed to energize lamp S.

In FIG. 3, switch 15 is dispensed with so that lamp S is kept energized during the time lamp F is energized for the photographing.

Figure 4:
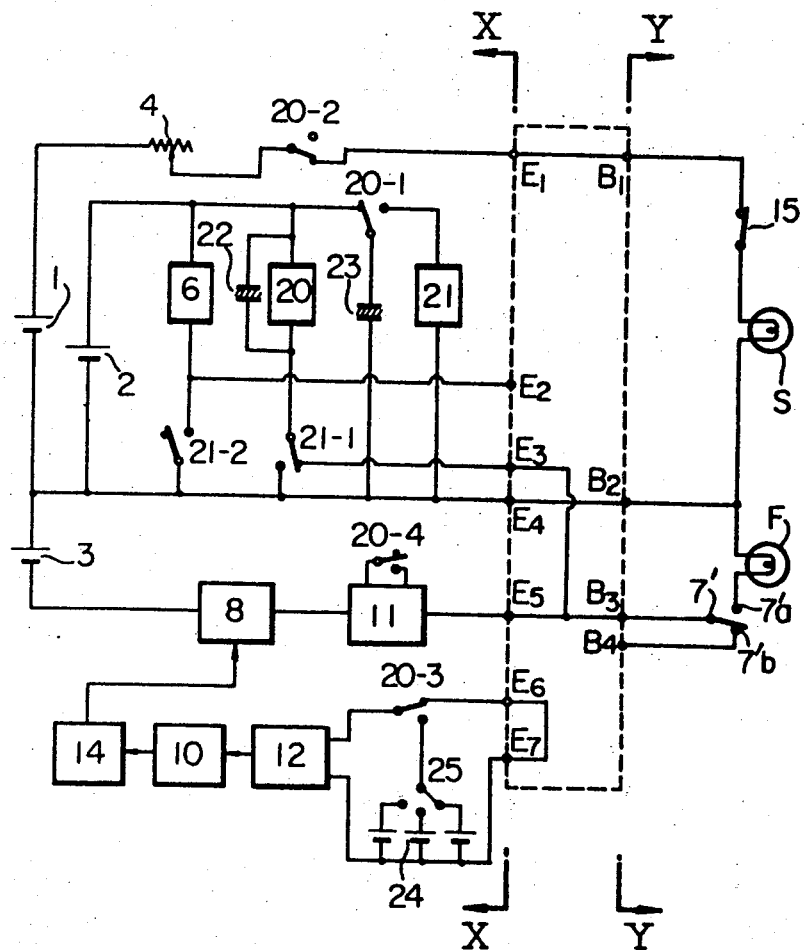
FIG. 4 is a diagram showing the electric connection of the electric power supplying device of the present invention with an endoscope of the manual exposure control type shown in FIG. 2.
Figure 5:
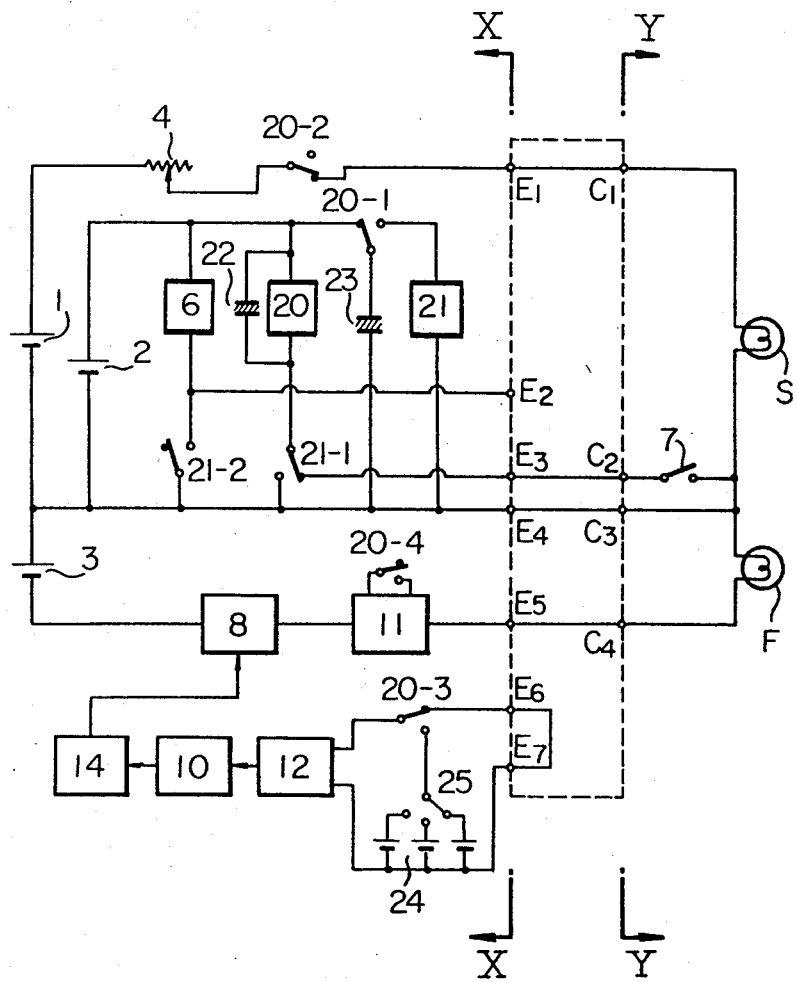
FIG. 5 is a diagram similar to FIG. 4 but showing the connection with another kind of the endoscope of the manual exposure control type shown in FIG. 3.
Figure 6:
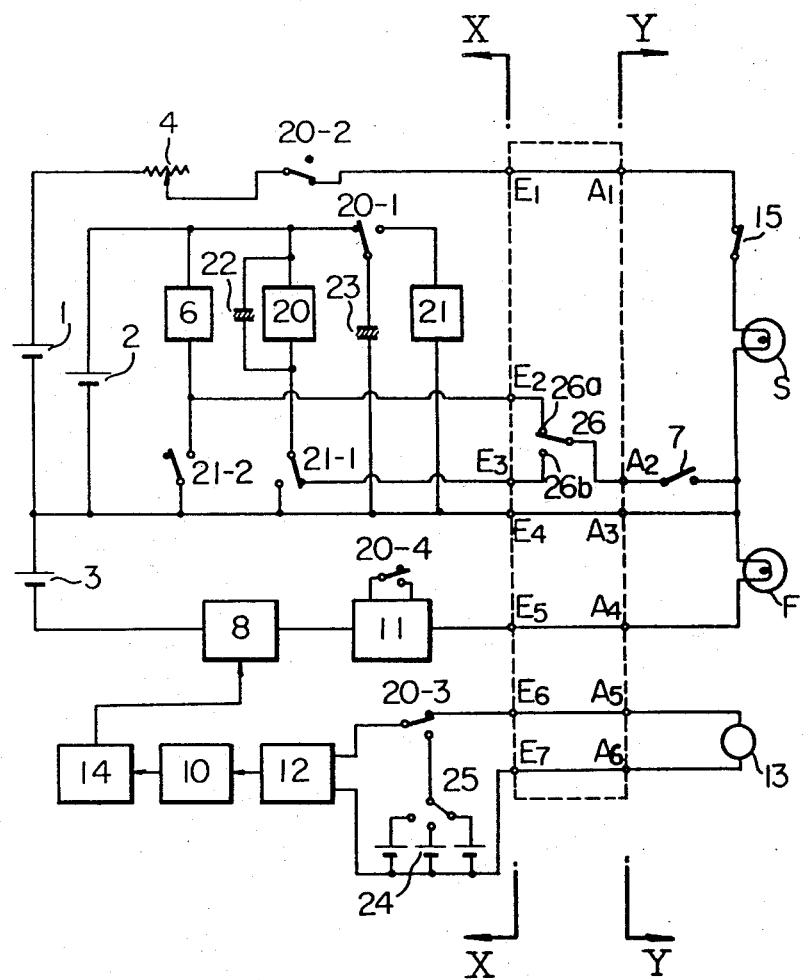
FIG. 6 is a diagram similar to FIG. 4 but showing the connection with the endoscope of the automatic exposure control type shown in FIG. 1.

FIGS. 4 to 6 show the electric power supplying device of the present invention commonly usable with the endoscopes shown in FIGS. 1 to 3, respectively.

FIG. 4 shows the connection of the electric power supplying device with the endoscope of FIG. 2.

The electric power supplying device of the present invention is generally similar to that shown in FIG. 1 except that relay 20 and relay 21 and electric source 24 of adjustable voltage are added to the circuit. One terminal of relay 20 is connected to the positive terminal of electric source 2 and the other terminal is connected to the movable contact of contacts 21-1 of relay 21 while one stationary contact of contacts 21-1 is connected to terminal $E_3$ and the other stationary contact of contacts 21-1 is connected to the negative terminal of electric source 2. A capacitor 22 is connected in parallel to relay 20.

One terminal of relay 21 is connected to one stationary contact of contacts 20-1 of relay 20 and the other terminal of relay 21 is connected to the negative terminal of electric source 2. The other stationary contact of contacts 20-1 is connected to the positive terminal of electric source 2 while the movable contact of contacts 20-1 is connected to one end of capacitor 23 the other end of which is connected to the negative terminal of electric source 2.

The terminal of relay 6 connected to terminal $E_2$ is connected to a stationary contact of contacts 21-2 of relay 21 while the movable contact of contacts 21-2 is connected to the negative terminal of electric source 2. Contacts 20-2 of relay 20 are provided between variable resistor 4 and terminal E₁.

One input terminal of amplifier 12 is connected to the movable contact of contacts 20-3 of relay 20 while one of the stationary contacts 20-3 is connected to terminal E₆ and the other stationary contact of contacts 20-3 is connected to the movable contact of switch 25 in adjustable electric source 24. Contacts 20-4 of relay 20 are connected in parallel to light intensity control circuit 11.

Terminals B₁, B₂, B₃ of the endoscope are connected to terminals E₁, E₄ and E₅, respectively, by means of the adapter, and terminal B₃ is connected to terminal E₃ in the adapter while terminals E₆ and E₇ are short-circuited by the adapter.

In operation starting under the condition shown in FIG. 4, capacitor 23 is charged through contacts 20-1 and lamp S is energized through contacts 20-2 and variable resistor 4. Voltage of adjustable electric source 24 is adjusted manually by switch 25 in accordance with the condition of the photographing, i.e., short-distance, medium distance or long-distance photography so that the adjusted reference voltage can be applied to amplifier 12 when release means is actuated. Upon actuation of release means for the exposure, switch 7' is switched to stationary contact 7a' so that the current flows from electric source 2, through relay 20, the movable contact of contacts 21-1, terminal E₃, terminal B₃, contact 7a', lamp F, terminal B₂, terminal E₄ to electric source 2 so that relay 20 is actuated, but the current is insufficient to light lamp F. Upon actuation of relay 20, the movable contact of contacts 20-1 is switched to relay 21 so that the electric charge of capacitor 23 is supplied to relay 21 to actuate the same. The capacity of capacitor 23 is so selected that relay 21 is actuated for a time period longer than the exposure time to be manually set by the operator. Upon actuation of relay 21, contacts 21-1 are switched so that relay 20 is connected directly to electric source 2 by-passing lamp F so as to be selfheld by virtue of contacts 21-1. (This self-holding action is released by means (not shown) when release means is freed.) When contacts 21-1 are switched, the current flowing through relay 20 is instantaneously interrupted. However, capacitor 22 supplies the current to relay 20 so that the actuation of relay 20 is not affected. Upon actuation of relay 20, contacts 20-2 are switched to disconnect lamp S from electric source 1 to deenergize same and contacts 20-3 are switched to connect adjustable electric source 24 to amplifier 12 so that the manually adjusted voltage is applied thereto while contacts 20-4 are closed to shorten the time period during which the high voltage is supplied to lamp F obtained by light intensity control circuit 11 so as to prevent lamp F from being burnt during the manual control of the exposure time.

By the switching action of contacts 21-2 upon actuation of relay 21, relay 6 is energized to render switching circuit 8 conductive so that the current controlled by light intensity control circuit 11 is supplied to lamp F to energize the same for the exposure. The reference voltage supplied from electric source 24 to amplifier 12 is amplified thereby and supplied to integrating circuit 10 thereby permitting the integrated output voltage of integrating circuit 10 to be detected by voltage detecting circuit 14.

When the detected voltage in detecting circuit 14 reaches a predetermined value set therein, switching circuit 8 is actuated by detecting circuit 14 so as to be rendered non-conductive thereby deenergizing lamp F to terminate the exposure after the time period set by the operator by manually adjusting the reference voltage of adjustable electric circuit 24. When release means is freed, the electric circuit is returned to the initial condition shown in FIG. 4.

FIG. 5 shows the electric connection of the electric power supplying device of the present invention with the endoscope of FIG. 3. The actuation of the arrangement of FIG. 5 is similar to that of FIG. 4 except that lamp S is not deenergized during the exposure.

FIG. 6 shows the electric connection of the electric power supplying device with the endoscope of the automatic exposure control type shown in FIG. 1.

Figure 7:
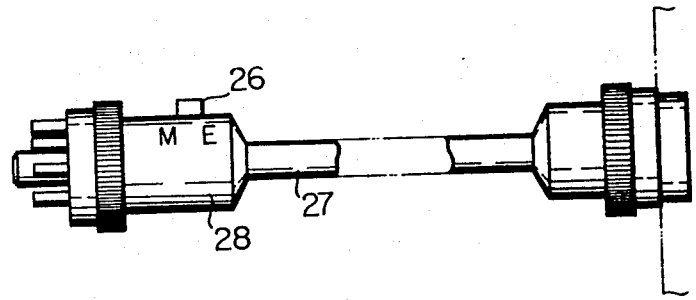
FIG. 7 is a side view showing the adapter for connecting the endoscope of the automatic exposure control type to the electric power supplying device of the present invention.

In this case, terminals A₁, A₃, A₄, A₅ and A₆ of the endoscope are connected through adapter 28 shown in FIG. 7 to terminals E₁, E₄, E₅, E₆ and E₇ of the electric power supplying device, respectively, and terminal A₂ is selectively connected by switch 26 in the adapter to terminal E₂ connected to contact 26a of switch 26 or terminal E₃ connected to contact 26b of switch 26.

In operation for the automatic exposure control, switch 26 is switched to contact 26a. Then, the operation of the electric power supplying device is the same as that described in connection with FIG. 1, wherein relays 20, 21 are inoperative and only relay 6 is actuated while adjustable electric source 24 is disconnected from amplifier 12 and photoelectric element 13 is connected to amplifier 12.

In operation for the manual exposure control, switch 26 is switched to contact 26b so that relays 20, 21 are actuated as in the case of the operation shown in connection with FIGS. 4 and 5. In this case adjustable electric source 24 is also connected to amplifier 12 in place of photoelectric element 13 by the switching of contacts 20-3 effected by the actuation of relay 20. The operation is the same as that described in connection with FIG. 4 or 5.

FIG. 7 shows the adapter to be used in the embodiment of FIG. 6. Adapter 28 has a sheath 27 connecting the connector to be connected to the endoscope having switch 26 and the connector to be connected to the electric power supplying device. Lead wires connecting the mating terminals shown in FIG. 6 extend in sheath 27 and contacts of switch 26 are connected to lead wires leading to terminal A₂, terminals E₂ and E₃, respectively.

By switching switch 26 to E, the endoscope is operated as the automatic exposure type while it is operated as the manual exposure control type by switching switch 26 to M.

Figure 8:
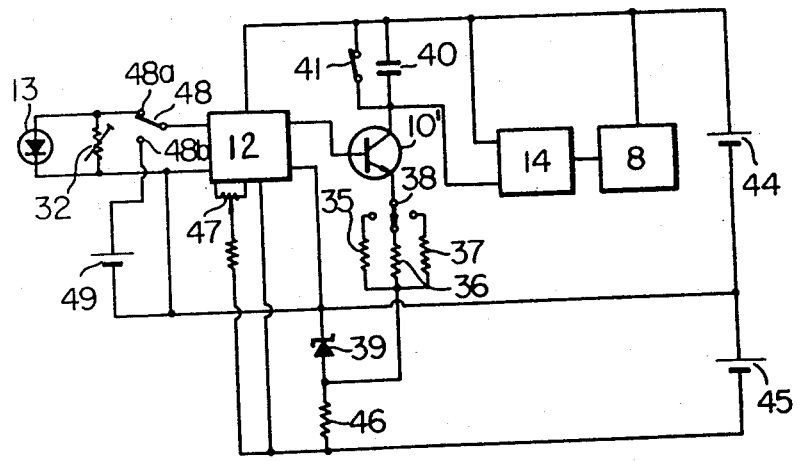
FIG. 8 is a diagram showing another embodiment of the exposure control circuit of the present invention capable of being commonly used with different kinds of endoscopes of the automatic exposure control type and with different types of the photosensitive materials, a part of the connection with the endoscope being omitted for the simplification of the showing.

FIG. 8 shows another embodiment of the present invention in which various kinds of endoscopes of the automatic exposure type and various types of the photosensitive materials are commonly used with the single electric power supplying device.

In order to obtain a proper exposure for the film or the photosensitive material, the following relations must be satisfied:

$$\int Q dt = (K/A) \qquad (1)$$

where:

$Q$ = the intensity of light given to the film
$A$ = the sensitivity of the film
$K$ = a constant selected for the proper exposure of the film Therefore, assuming that the output voltage of the photoelectric element provided in the endoscope for receiving the light from the object is $V_1$ and $k_1$ is a constant, when the relation between the output voltage of the photoelectric element and the intensity of light given to the film is adjusted to satisfy the following equation:

$$V_1 = K_1 Q \qquad (2)$$

and a capacitor having the capacity C is charged from zero potential by the current I proportional to the above voltage $V_1$, then the terminal voltage $v$ of the capacitor is represented by the following equation:

$$I = k_2 V_1 \qquad (3)$$

where $k_2$ is a constant, thus the following relation is obtained:

$$\int I dt = cv \qquad (4)$$

From the above equations (1), (2), (3) and (4), $$v = (k_2/A) \cdot (k_1 K/C) \qquad (5)$$

Therefore, the proper exposure is obtained when the terminal voltage of the capacitor reaches a value satisfying the above equation (5).

By varying the constant $k_2$ appropriately in accordance with the various kinds of endoscopes or the various types of the photosensitive materials, the proper exposure is obtained when the terminal voltage $v$ of the capacitor reaches the same value described above.

In FIG. 8, photoelectric element 13 such as a solar battery is selectively connected to amplifier 12 through an adapter (not shown) having switch 48 similar to switch 26 shown in FIGS. 6 and 7 for effecting the automatic exposure control. When switch 48 is switched, an adjustable electric source 49 similar to voltage source 24 in FIGS. 4 to 6 is connected to amplifier 12 for the manual exposure control in like manner as described in connection with FIGS. 4 and 5.

Variable resistor 32 is connected in parallel to photoelectric element 13 so that the output voltage $V_1$ thereof to be supplied to amplifier 12 can be adjusted to satisfy the above equation (2) by appropriately adjusting variable resistor 32.

The base of transistor 10' of an integrating circuit consisting of transistor 10' and capacitor 40 is connected to one output terminal of amplifier 12 while the emitter of transistor 10' is connected to the movable contact of switch 38 capable of being switched to connect to one end of either of resistors 35, 36 and 37. The opposite ends of resistors 35, 36 and 37 are connected to the junction of Zener diode 39 and resistor 46 connected in series to the terminals of electric source 45. The collector of transistor 10' is connected to capacitor 40 and a normally closed switch 41 is connected in parallel to capacitor 40 so as to normally maintain capacitor 40 in deenergized state. Switch 41 is opened in coupled relation to the operation of release means so as to charge capacitor 40 by electric source 44 connected as shown to energize amplifier 12, transistor 10', detecting circuit 14 and switching circuit 8. Voltage detecting circuit 14 is connected to both ends of capacitor 40 so that, when the terminal voltage of capacitor 40 reaches a predetermined value, detecting circuit 14 is actuated to actuate switching circuit 8 connected thereto. Switching circuit 8 deenergizes the lamp for the photographing in like manner as described previously.

In accordance with one feature of the present invention, variable resistor 47 is connected between amplifier 12 and electric source 45, so that the output voltage α of amplifier 12 appearing when the input voltage thereof is zero can be freely adjusted by adjusting variable resistor 47.

Thus, the output voltage $V_2$ of amplifier 12 is represented by the following equation:

$$V_2 = k_3 V_1 + \alpha \tag{6}$$

In operation for the automatic exposure control after switch 48 is switched to contact 48a, the output voltage of photoelectric element 13 is adjusted by resistor 32 to satisfy the above equation (2) and the adjusted output voltage is applied to amplifier 12. Since the output of amplifier 12 is connected to the base of transistor 10', the voltage $V_2 - V_{BE}$ appears at the emitter of transistor 10, where voltage $V_{BE}$ is the base-emitter voltage of transistor 10.

By selecting the voltage $V_Z$ of fixed voltage diode 39 to be $$V_Z = V_{BE},$$

then the terminal voltage $V_{36}$ of resistor 36, when the same is connected to transistor 10' through switch 38, is represented by the following equation:

$$V_{36} = V_2 - V_{BE} + V_Z \tag{7}$$

By applying the above equation (6) to equation (7), $$V_{36} = k_3 V_1 + (\alpha + V_Z - V_{BE}) \tag{8}$$

When variable resistor 47 is adjusted so that the voltage $(\alpha + V_Z - V_{BE})$ is made zero by adjusting voltage α, then $$V_{36} = k_3 V_1 \tag{9}$$

Assuming that the resistance of resistor 36 is $R_{36}$, then the following relation is obtained:

$$I = (k_3 V_1 / R_{36}) \tag{10}$$

where $I$ is the current flowing through resistor 36.

This means that current $I$ is proportional to voltage $V_1$. Since current I flows through the collector of transistor 10', capacitor 40 is charged by current $I$ when switch 41 is opened in coupled relation to the operation of release means.

When the terminal voltage of capacitor 40 reaches a predetermined value, detecting circuit 14 is actuated to actuate switching circuit 8 to deenergize the lamp for the photographing so as to achieve the proper exposure.

If the resistances $R_{35}$, $R_{36}$, $R_{37}$ of resistors 35, 36, 37 are selected to be $$R_{35} < R_{36} < R_{37}$$

then the current $I$ is made greater under the same output voltage $V_1$, when resistor 35 is connected to transistor 10' by switching switch 38 so that the time required to raise the terminal voltage of capacitor 40 is made shorter thereby making the exposure time shorter. When resistor 37 is connected, the exposure time is made longer. Therefore, the proper exposure is obtained for various types of films or various kinds of endoscopes by appropriately selecting the resistance of each of resistors 35, 36, 37.

Since the temperature coefficient of base-emitter voltage $V_{BE}$ is inversely related to the temperature coefficient of voltage $V_Z$ of fixed Zener diode 39, the charging current for capacitor 40 is not influenced by the change in temperature.

By switching switch 48 to connect adjustable voltage source 49 to amplifier 12, the device can be operated for the manual exposure control in like manner as previously described.

Figure 9:
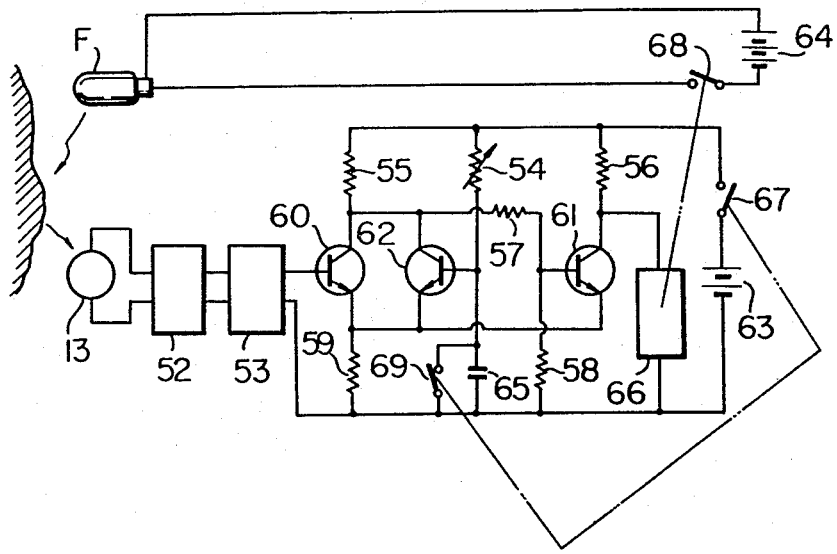
FIG. 9 is a diagram showing a further embodiment of the exposure control circuit of the present invention provided with a safety device for the lamp for the photographing, the electrical connection with the endoscope being simplified for the better understanding of the showing.

FIG. 9 shows a further embodiment of the invention in which a safety device prevents damage to the photographed object by the excessive heat of the lamp for the photographing when the exposure time is made excessively long under the automatic exposure control.

The general arrangement of the device is substantially similar to those described previously. Photoelectric element 13 supplies its output indicative of the intensity of light reflected from the object which is illuminated by lamp F for the photographing to amplifier 52 which in turn supplies its output to integrating circuit 53. The voltage detecting circuit is in the form of a Schmitt circuit consisting of transistor 60, transistor 61, resistors 55, 56, 57, 58 and 59 connected as shown and, when switch 67 is closed in coupled relation to the operation of release means, the voltage of electric source 63 is applied to the circuit so as to render transistor 61 conductive while transistor 60 is made non-conductive so as to integrate the voltage supplied. When the integrated voltage in the circuit reaches a predetermined value, transistors 60, 61 are inverted to render transistor 61 non-conductive while transistor 60 is made conductive. Switching circuit 66 is connected to the output of transistor 61 so that, when transistor 61 is made conductive, switching circuit 66 is actuated to close switch 68 so that lamp F is energized by electric source 64. When transistor 60 is made conductive and transistor 61 is rendered non-conductive, switching circuit 66 is actuated to open switch 68 so as to terminate the energization of lamp 64 for achieving the proper exposure time.

In accordance with the present invention, transistor 62 is connected in parallel to transistor 60 and variable resistor 54 and capacitor 65 are connected in series to the terminals of electric source 63 so as to form a timing circuit. The base of transistor 62 is connected to the junction of resistor 54 and capacitor 65 and normally closed switch 69 is connected in parallel to capacitor 65 so that capacitor 65 is normally deenergized. Switch 69 is opened in coupled relation with the closure of switch 67.

In operation, when the intensity of light received by photoelectric element 13 is low and, hence, the output thereof is very low, a long time is required for rendering transistor 60 conductive so as to deenergize lamp F which might cause damage to the object. In such a case, since switch 69 is opened upon actuation of release means to commence the charging of capacitor 65, the timing circuit consisting of variable resistor 54, capacitor 65 and transistor 62 is actuated so as to render transistor 62 conductive when the terminal voltage of capacitor 65 reaches a predetermined value so that the current flowing through transistor 61 is switched to flow through transistor 62 thereby actuating switching circuit 66 so as to open switch 68 to deenergize lamp F. The time required for raising the terminal voltage of capacitor to the predetermined value is determined by the time constant set by the resistance of variable resistor 54 and the capacity of capacitor 65. Therefore, the time at which lamp F is deenergized is adjusted by adjusting variable resistor 54.

Thus, damage to the object such as a diseased portion of a human body can be prevented by the present invention.

Figure 10:
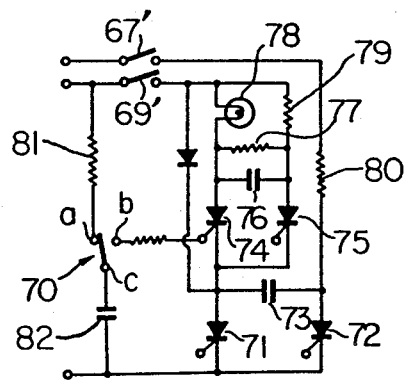
FIG. 10 is a diagram showing the electric connection of the light intensity control circuit for the lamp for the photographing incorporated in the electric power supplying device of the present invention.

FIG. 10 shows a still further embodiment of the present invention by which a high voltage is first supplied to the lamp for the photographing so as to quickly raise the intensity of light emitted from the lamp and, after a predetermined time period, the voltage applied to the lamp is lowered so as to prevent the burning thereof while the intensity of light from the lamp is maintained unchanged.

In FIG. 10, one end of lamp 78 for the photographing is connected to one terminal of the electric source (not shown) through switch 69' while the other end is connected to the anode of thyrister 74 the cathode of which is connected to the anode of thyrister 71. The cathode of thyrister 71 is connected to the other terminal of the electric source. The cathode of thyrister 75 is connected to the junction of thyristers 74, 71 while the anode of thyrister 75 is connected to the other end of lamp 78 through resistor 77 and to switch 69' through a resistor 79. Turn-off capacitor 76 is connected in parallel to resistor 77. The anode of thyrister 72 is connected to the anode of thyrister 71 through turn-off capacitor 73 and to one terminal of the electric source through switch 67' and a resistor 80, while the cathode of thyrister 72 is connected to the other terminal of the electric source. Stationary contact a of switch 70 is connected to one end of a resistor 81 the other end of which is connected to the one terminal of the electric source while the movable contact e of switch 70 is connected to one end of a capacitor 82 the other end of which is connected to the other terminal of the electric source and stationary contact b of switch 70 is connected to the gate of thyrister 74. The gate of thyrister 72 is connected to the exposure control circuit (not shown) such as that previously described. The gate of thyrister 71 is connected to one output terminal of a conventional monostable multivibrator (not shown) incorporated in the electric power supplying device while the gate of thyrister 75 is connected to the other output terminal of the monostable multivibrator.

In operation, switches 67', 69' are closed in coupled relation with the operation of release means and, at the same time, switch 70 is switched to contact b. At the same time or immediately after switch 70 is switched to contact b, a signal is applied to the gate of thyrister 71 from the one output of the monostable multivibrator so that thyristers 74, 71 are rendered operative so as to energize lamp 78 by current not passing through resistor 77 thus rapidly raising the intensity of light from lamp 78 to a desired intensity. After a predetermined time set by the monostable multivibrator, a signal is supplied to the gate of thyrister 75 from the other output terminal of the monostable multivibrator so that thyrister 74 is rendered inoperative by the provision of turn-off capacitor 76 so as to apply the voltage of the electric source through resistor 77 to lamp 78 so that lamp 78 is energized at the lowered voltage to maintain the desired intensity of light. After the time determined by the exposure control circuit, a signal is applied to the gate of thyrister 72 thereby rendering thyrister 71 inoperative by the provision of turn-off capacitor 73 to deenergize lamp 78 to achieve the proper exposure.

In accordance with the present invention described above, the intensity of light from the lamp for the photographing is quickly raised so that extremely short exposure time is available without deteriorating the quality of the photographs while the burning of the lamp is positively prevented.

I claim:

1. In the combination of a photographic endoscope having both manual and automatic exposure control, said endoscope including at least an observation lamp and a lamp for illuminating an object to be photographed and a universal power supply connectable to the endoscope, the power supply comprising:
    a first DC source for energizing said observation lamp;
    a second DC source for energizing said illuminating lamp;
    a first, normally open, switching circuit serially connected in the circuit between said second DC source and said illuminating lamp;
    a first relay means for closing said first switching circuit to energize said illuminating lamp;
    a manual exposure control circuit for controlling the time interval during which said first switching circuit energizes said illuminating lamp;
    a second relay means, actuated by closure of an external pair of contacts in the shutter release mechanism of said endoscope, for terminating the energization of said observation lamp and for enabling said manual exposure control circuit; and
    a third relay means, actuated by the closure of a pair of contacts associated with said second relay means, for energizing said first relay means and for providing a self-holding closure for said second relay means, whereby said illuminating lamp is energized for a time period determined by said manual exposure control circuit.

2. In the combination as set forth in claim 1, wherein said endoscope includes a photo-electric device for measuring the intensity of light reflected for the object to be photographed and wherein an automatic exposure control circuit is substituted for said manual exposure control circuit, said automatic exposure control circuit comprising:
    an amplifier having its input connected to said photoelectric element;
    means for adjusting the gain of said amplifier, in the absence of any input signal thereto;
    a transistor having its base connected to the output of said amplifier;
    a resistor in the emitter circuit of said transistor;
    a capacitor in the collector circuit of said transistor, the charge accumulated in said capacitor, by virtue of said resistor, being proportional to the illumination received by said photo-electric elements;
    a pair of normally closed contacts connected across said capacitor, said contacts being coupled to said shutter release, to inhibit charging of said capacitor until said shutter release is actuated; and
    a voltage detector, having its input connected to said capacitor and its output connected to said first switching circuit, said detector having a pre-determined threshold such that, as the voltage across said capacitor rises to exceed said threshold, said detector de-activates said switching circuit thereby terminating energization of said illuminating lamp.

3. The universal power supply according to claim 2, further comprising:
    an adjustable source of DC potential; and
    switching means, connected to the input of said amplifier, for selectively connecting said source of DC potential to said amplifier, whereby the time interval required for the voltage across said capacitor to exceed said threshold is determined by the amplitude of said adjustable DC potential, to effect manual exposure control.

4. The universal power supply according to claim 1 including
    an amplifier connected to said photo-electric element;
    an integrating circuit connected to the output of said amplifier for integrating the amplified output voltage from said photo-electric element;
    a Schmitt trigger circuit having its input connected to the output of said integrating circuit, said Schmitt trigger having a predetermined threshold voltage;
    a switching circuit connected to the output of said Schmitt trigger and including means for alternately energizing and de-energizing said illuminating lamp; and
    a timing circuit connected to said Schmitt trigger, said timing circuit including:
    a transistor;
    the serial connection of a capacitor and a variable resistor, the juncture of said resistor and capacitor being connected to the base of said transistor; and
    a pair of switch contacts connected across said capacitor to inhibit charge storage therein until said endoscope shutter release is depressed, said timing circuit returning said Schmitt trigger to its original state upon expiration of a time interval determined by the time constant of said timing circuit.

5. The universal power supply according to claim 1 wherein said manual exposure control circuit comprises:
   a source of reference potential;
   means for selectively varying the magnitude of said reference potential in accordance with the exposure desired;
   an amplifier connected to said potential varying means;
   an integrating circuit, connected to the output of said amplifier, to integrate the amplified voltage from said reference source;
   a voltage detector circuit, having a predetermined threshold, connected to the output of said integrating circuit, said detector being connected to said first switching circuit to de-activate same when the output of said integrating circuit exceeds said threshold; and,
   means, connected to the input of said amplifier, for selectively switching said amplifier from said source of reference potential to the output of a photo-electric cell, in the event said power supply is associated with an endoscope of the automatic exposure type.

6. The power supply according to claim 1, further comprising:
   a light intensity control circuit, serially connected with said first switching circuit, to apply an initial potential to said illuminating lamp and, after said lamp is lit, to apply a lesser potential thereto, thereby prolonging the life of said lamp, and minimizing risk of harm to the object to be photographed.

7. The power supply according to claim 6 wherein said light intensity control circuit comprises:
   a first thyristor, serially connected between said illuminating lamp and said second DC source;
   a second thyristor and a resistor connected in series, across said first thyristor and providing an alternate path for current flowing through said illuminating lamp;
   a first turn-off capacitor interconnecting the anodes of said first and second thyristors, in parallel with said resistor; and
   a mono-stable multivibrator having a first output connected to the trigger electrode of said first thyristor to energize same, after closure of a contact coupled to said shutter release, to thereby permit passage of a first current through said illuminating lamp, and a second output connected to the trigger electrode of said second thyristor to extinguish said first thyristor, activate said second thyristor, and reduce the current flow through said illuminating lamp by the voltage drop across said resistor.

8. The power supply according to claim 7 further comprising:
   a third thyristor serially connected with said first and second thyristors, the trigger electrode thereof being connected to the first output of said multivibrator;
   means for selectively connecting the trigger electrode of said first thyristor, through a resistor, to one terminal of said second DC source;
   a fourth thyristor serially connected with a resistor across said second DC source;
   a second turn-off capacitor connecting the anodes of said third and fourth thyristors, the trigger electrode of said fourth thyristor being connected to the output of said manual exposure control circuit, whereby when said exposure control circuit determines that said illumination lamp has been illuminated for a sufficient time interval, said fourth thyristor is triggered on, thereby extinguishing said third thyristor, in turn extinguishing said second thyristor.

* * * * *